United States Patent [19]

Schneider

[11] Patent Number: 5,673,269
[45] Date of Patent: Sep. 30, 1997

[54] METHOD AND APPARATUS FOR DETECTING VALID DATA PEAKS

[75] Inventor: Richard Crane Schneider, Boulder, Colo.

[73] Assignee: Storage Technology Corporation, Louisville, Colo.

[21] Appl. No.: 502,195

[22] Filed: Jul. 13, 1995

[51] Int. Cl.$^6$ .............. H03M 13/00; G11B 5/09
[52] U.S. Cl. .................. 371/6; 369/53; 369/60
[58] Field of Search ................. 371/6, 24, 67.1; 360/45, 46; 369/44.34, 59, 60, 53, 54

[56] References Cited

U.S. PATENT DOCUMENTS

| | | | |
|---|---|---|---|
| 3,846,829 | 11/1974 | Lin | 360/46 |
| 4,626,933 | 12/1986 | Bucska et al. | 360/51 |
| 5,237,554 | 8/1993 | Senshu et al. | 369/59 |
| 5,276,666 | 1/1994 | Gunther et al. | 369/59 |
| 5,345,216 | 9/1994 | Chopra et al. | 340/146.2 |
| 5,388,011 | 2/1995 | Tollum | 360/46 |
| 5,400,188 | 3/1995 | Hirschenberger et al. | 360/50 |

OTHER PUBLICATIONS

Richard C. Schneider; Sequence (Viterbi–Equivalent) Decoding.

*Primary Examiner*—Robert W. Beausoliel, Jr.
*Assistant Examiner*—Trinh L. Tu
*Attorney, Agent, or Firm*—Duft, Graziano & Forest, P.C.

[57] ABSTRACT

Method and apparatus for detecting valid data peaks read from a magnetic medium. Signals representing the peaks are entered into a shift register. Logic circuitry including comparator are connected to stages of the shift register to determine the relative magnitude of a peak sampled at time N versus subsequently sampled peaks. The generated magnitude information is used to determine which of the signals represent valid data peaks and which represent noise and the like.

8 Claims, 4 Drawing Sheets

METHOD AND APPARATUS FOR DETECTING VALID DATA PEAKS

FIELD OF THE INVENTION

The present invention relates to a method and apparatus for detecting valid data peaks processed by the read channel of a magnetic tape or disk system. More particularly, the invention relates to a method and apparatus for qualifying valid data peaks received along with invalid peaks during the reading of data from a magnetic medium such as a tape or disk. Still more particularly, the invention relates to a method and apparatus for eliminating signals representing invalid peaks and providing an output representing only valid data peaks.

PROBLEM

High density recording and playback techniques are currently used to achieve operational advantages and economies in data processing and storage systems. The current trend is towards increasingly high data storage densities, including a greater linear density such as, for example, an increasing number of bits per inch. This trend also includes higher track densities such as a greater number of tracks per inch. While the recording, storage, and playback of data using high density techniques is advantageous, it also has operational disadvantages. A primary one of these is the generation of extraneous signals and data read from a high density medium. As the linear track densities increase, frequency noise is increased so that the read signal amplitude of the valid signals is decreased and is closer to the amplitude of the system electrical noise. Thus, more reliable read-signal detection systems are needed to eliminate invalid signal peaks and to provide an output signal containing only signal peaks representing valid data peaks.

It is known to use threshold detection to filter out peaks whose amplitude does not exceed a prescribed signal level commonly called a threshold or reference. However, false peaks may also exceed the prescribed threshold and therefore this procedure by itself is not an adequate means for eliminating peaks representing invalid signals. U.S. Pat. No. 5,276,666 to Gunther, et al., as well as U.S. Pat. No. 5,345,216 to Chopra, et al. disclose apparatus for deriving valid data signals from the reading of magnetic medium containing both invalid data signals and invalid noise signals. An article entitled, "Sequence (Viterbi-Equivalent) Decoding", by Richard C. Schneider, IEEE Transactions on Magnetics, vol. MAG-24, no. 6, November 1988 discloses a detector intended for use with a (0,3) modulation code. Although the Schneider detector functions satisfactory when used to detect (0,3) modulation code signals, a detector for data written with a (0,3) modulation code will not reliably detect data written with a (1,7) modulation code. Although the and apparatus and methods shown in these U.S. patents and in the Schneider article are adequate to serve their intended purpose, they do so by means of facilities that are either costly and complex and which increase the resultant cost of the apparatus of which they are a part, or they are unable to work reliably with (1,7) encoded data.

It can therefore be seen that the prior art solutions for eliminating invalid signal peaks are not totally satisfactory. There exists a need for improved method and apparatus and for reading high density data signals from a magnetic medium, for eliminating and disregarding the data signals representing noise, and other invalid data peaks and for providing an output that contains only signals representing valid data.

SOLUTION

The present invention solves the above discussed problems and achieves an advance in the art by providing a data signal detection method and apparatus which eliminates invalid signal peaks caused by noise and the like and which provides an output signal containing only the valid data peaks read from a magnetic medium. The detector of the present invention is effective in the detection of correct data when a valid data peak represented by a binary one has been recorded in a first bit cell is and read in the presence of noise in an adjacent bit cell that is nominally less than the average peak value of the valid data peak. The detector is further effective in the detection of correct data when a valid data peak is recorded in a first bit cell, and read in the presence of noise in bit cells not immediately adjacent to the first bit cell where noise is nominally less than the average peak value of the valid data peak. In accordance with another aspect of the detector comprising the present invention, the value of a reference signal can be controllably varied to facilitate error recovery procedures as the magnetic medium is read and it's recorded data signals are applied to the detector comprising the present invention. Specifically, a reference voltage VR can be controllably varied so that it will have a lesser value (such as less than one) in a region of media defects where the signal dropout errors are common. Conversely, the reference voltage VR can be made larger (such as larger than one) in a region of high noise.

The present invention comprises circuitry that is far simpler from that heretofore available and operates with improved reliability. The apparatus and method of the invention provides for the reliable detection of data that has been recorded using high density techniques on a magnetic tape or disk system. It provides data detection that is more reliable than the well known peak detection method. It operates reliably with data that has been recorded with a (1,7) modulation code where the equalized readback pulses are approximately 4 bits wide. It also detects read signal pulses that have been equalized such that the pulse for the valid data peak is nominally 4 code bits wide at the baseline and so that there is a minimum of interference between adjacent recorded pulses. The apparatus and method of this invention also implements a detection system that uses a minimum amount of hardware complexity to achieve the desired data detection reliability improvement. In accordance with the present invention, an A/D converter receives the analog samples read from a tape or disk, converts the analog signal samples to digital, and applies the digital samples to a shift register. The shift register stores the values of seven successive samples. Comparators are connected to the stages of the shift register as well as to arithmetic logic units (ALU) which receives the output of the last stage of the shift register. The comparators provide output signals indicating the relative magnitude of the different stages of the shift register to which each comparator is connected. The ALU receives a reference voltage VR and algebraically adds the reference voltage to the magnitude of the sample stored in the last stage of the shift register. Both a positive and a negative ALU are provided and are controllably switch selected for use in accordance whether the detector is searching for a positive pulse or for a negative pulse.

The outputs of the comparators are applied to an array of AND gates each of which provides an output pulse when all of its inputs are driven high. This occurs when the comparators connected to the inputs of each AND gate all simultaneously producing an output indicating that the pair of shift register stages to which each comparator is connected have the specified relative magnitude required to activate the output of the comparator. Each AND gate has a plurality of inputs that are connected to the output of different comparators. The output of each AND gate goes high to represent a binary 1 when all of the comparators to which the AND gate is connected generate a "greater than" output signal. This occurs for each comparator when the pair of shift register stages with which the comparator is connected assumes the required relative magnitude with respect to each other. The output of the AND gates are connected to inputs of an OR gate whose output generates a positive pulse indicating that a valid data pulse has been read from the associated magnetic medium.

The apparatus of the present invention is intended for use with data stored on a magnetic medium in such a manner that output signals representing binary 1's are represented on the magnetic medium by alternating positive and negative signal peaks. Binary 0's are represented by the absence of a signal peak on the magnetic medium. Since the circuitry of the present invention is required to detect both positive and negative signal peaks, a pair of arithmetic logic units are provided. One of the ALU's is operative when a positive signal peak is detected, the other is operative when a negative signal peak is detected. A controllable switch selects the ALU that is to be active at any time in accordance with whether a positive or a negative signal peak is to be detected. Each comparator has a pair of outputs, one of which goes high when a first signal to the comparator is greater than a second applied signal. The second output of the comparator is associated with the detection of a negative signal peak and goes high when the pair of signals applied to the comparator have a relationship such that one input is greater than the other input in a negative sense.

Positive pulse detection logic as well as negative pulse detection logic is provided. The positive pulse detection logic comprises a first set of AND gates and a single OR gate with the inputs of the different AND gates being connected to the outputs of the comparators that are activated in response to the generation of a positive pulse. The second set of AND gates, together with an associated OR gate are connected in a similar manner to the outputs of the comparators that are activated to the detection of a negative signal peak. The outputs of the two OR gates are applied to inputs of a third OR gate whose single output is applied to a utilization circuit which receives the signal output of the detection circuitry embodying the invention and indicating the detection of signal peaks representing valid data pulses.

DESCRIPTION OF THE DRAWINGS

These and other advantages of the invention may be better understood from a reading of the following description of one possible preferred exemplary embodiment of the invention taken in conjunction with the drawings in which.

THE DETAILED DESCRIPTION

Figure 1:
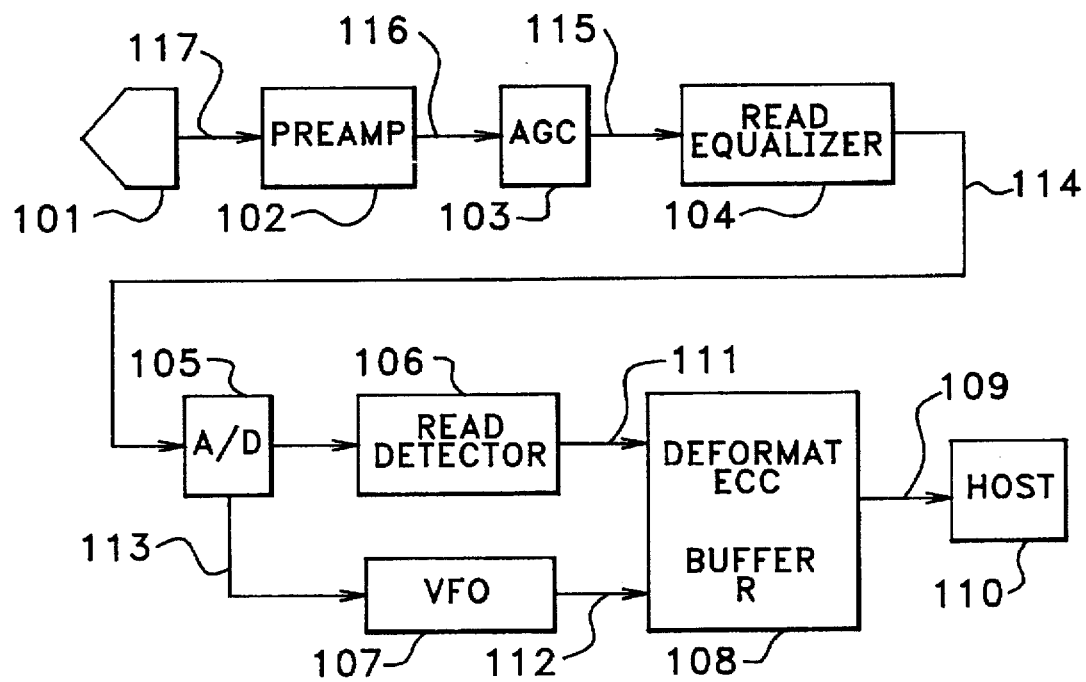
FIG. 1 discloses a system embodying the invention.

Description of FIG. 1

FIG. 1 discloses a system 100 embodying the invention which reads information from a magnetic medium such as a disk or tape, processes the information and applies it over path 109 to host 110. System 100 receives signals from the magnetic medium representing both valid data peaks as well as peaks that represents unwanted signals such as noise or the like. System 100 analyzes the receive signals, discards the signals representing invalid peaks and applies only output signals representing valid data peaks to host 110.

On FIG. 1, element 101 depicts the read head which reads the electrical signals recovered from the magnetic tape or disk. Read head 101 may be of any suitable types such as inductive or magnetoresistive. The output of read head 101 is applied to preamplifier 102 which amplifies the receive signals and applies them to automatic gain control circuit 103 whose function is to maintain an output having a constant signal amplitude. Circuit 103 compensates for variations in media, circuitry, and the read head itself. The output of AGC circuit 103 is applied to read equalizer 104 which shapes the signal into a form that is suitable for a read detection function. The A/D converter 105 receives analog signals from read equalizer 104, converts them to digital and applies them to read detector 106 and the VFO 107.

Conceptually, read detector 106 may be of any type known in the art such as, for example, the well known conventional peak detector. Advantageously, the read detector 106 may comprise apparatus of the present invention which performs the read detection function so that there are fewer read signal detection errors in the presence of electrical noise or other signal impairments. VFO 107 comprises a circuit that derives clocking information from the data generated by the A/D converter 105 to assign the data outputted by read detector 106 to the correct bit cell. Element 108 performs various functions including deformatting, error correction and a buffer memory function. The data outputted from element 108 is applied over path 109 to the host computer 110.

Figure 3:
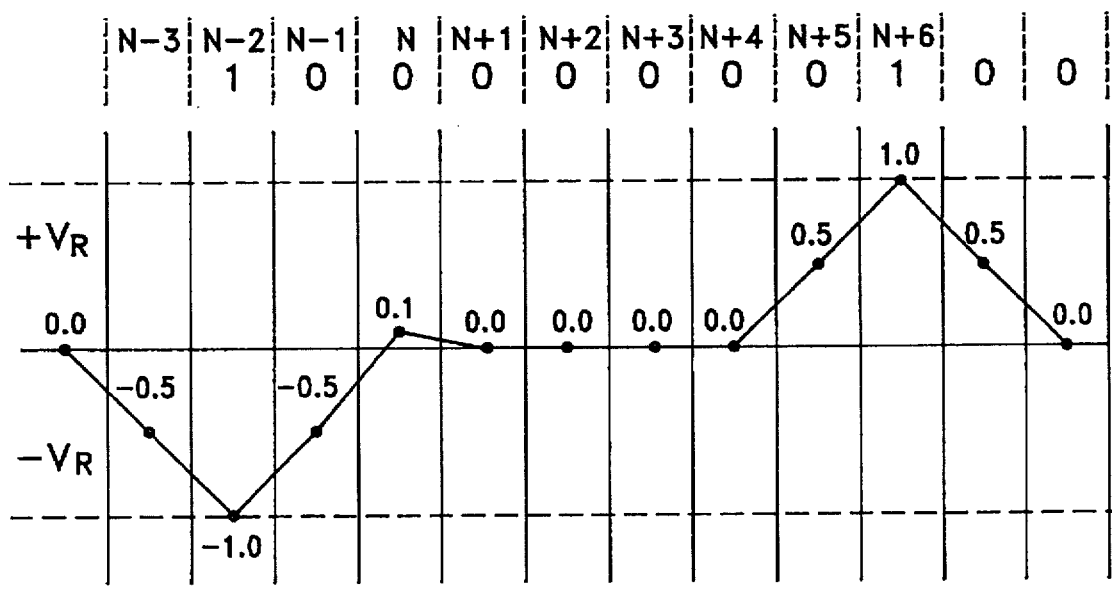
FIG. 3 discloses an illustrative wave form containing data and noise signals of the type that am to be detected and processed by the present invention.
Figure 2:
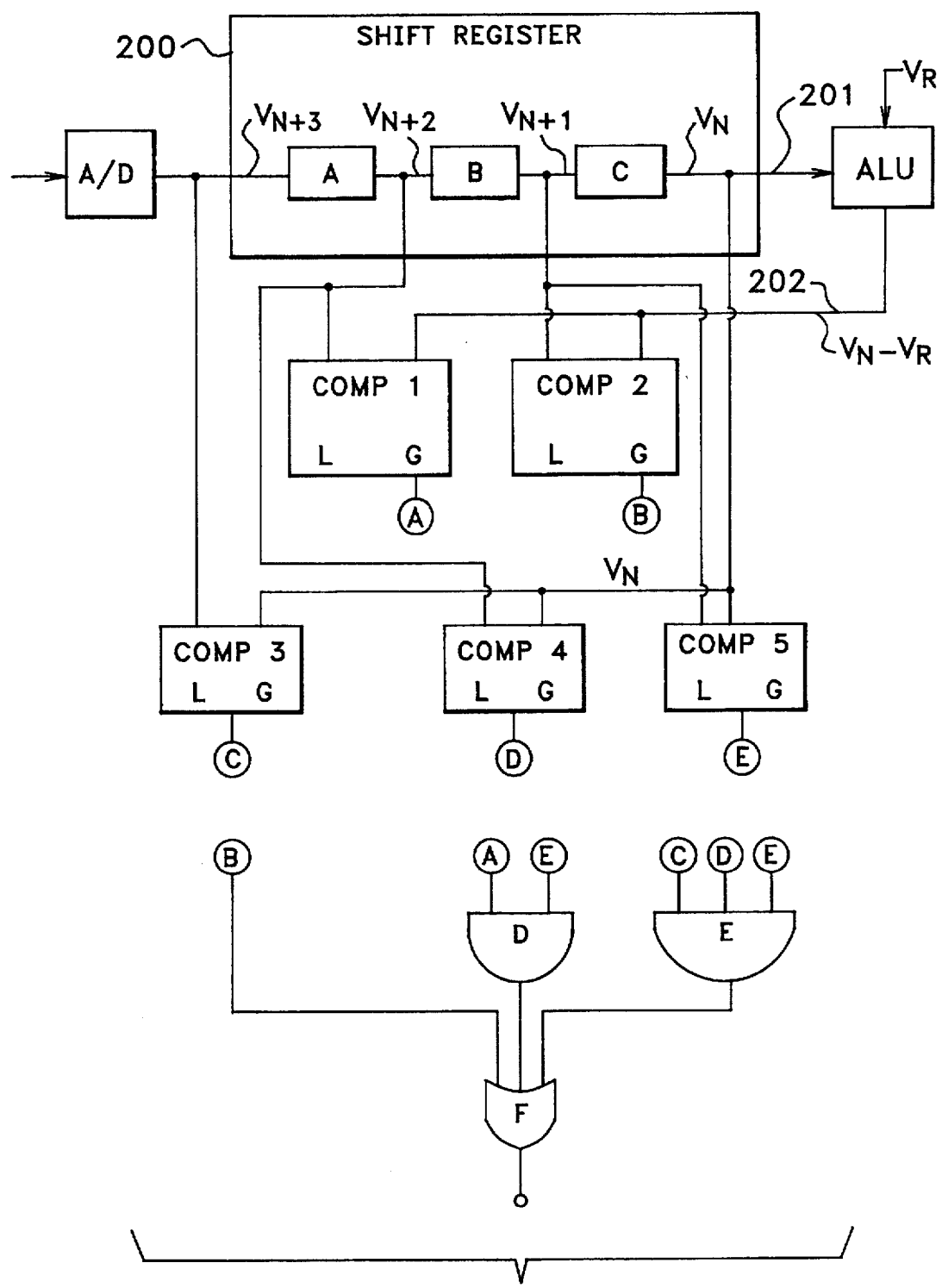
FIG. 2 discloses a prior art signal peak decoder.

Description of FIG. 2 and 3

FIG. 2 discloses details of the detector disclosed in the aforementioned article by Richard C. Schneider. The FIG. 2 detector is intended for use with a (0,3) modulation code. The detector of FIG. 2 is designed for data written with a (0,3) modulation code and will not reliably detect data written with a (1,7) modulation code, as will be seen in the following example. FIG. 3 shows a typical read signal recorded using a (1,7) modulation code. ONES are read back as a pulse, ZEROS are the absence of a pulse. In this example, the sample values at times N, N+1, N+2, N+3 are 0.1, 0.0, 0.0, and 0.0. There is a small positive overshoot in the read signal at time N.

The circuit of FIG. 2 detects a ONE when:

$$V(n)-A \geq V(n+1) \tag{1}$$

Where A represents the average absolute value of the peak amplitude of a valid data peak
OR $$V(n) > V(n+1) \text{ AND } V(n)-A \geq V(n+2) \tag{2}$$

OR $$V(n) > V(n+1) \text{ AND } V(n) > V(n+2) \text{ AND } V(n) > V(n+3) \tag{3}$$

A negative one is detected at time n when:

$$V(n)+A \leq V(n+1) \tag{4}$$

OR $$V(n) < V(n+1) \text{ AND } V(n)+A \leq V(n+2) \quad (5)$$

OR $$V(n) < V(n+1) \text{ AND } V(n) < V(n+2) \text{ AND } V(n) < V(n+3) \quad (6)$$

When the logic of equation 3 is used by the circuit of FIG. 2, a positive pulse for a ONE would be falsely detected at time N on FIG. 3 since 0.1 is greater than the signals 0.0, 0.0, and 0.0 at times N+1, N+2, and N+3. This signal at time N would be detected as valid ONE in place of the true positive pulse at time N+6. This demonstrates, that the prior art logic for (0,3) codes cannot be used to detect read signals that have been recorded with a (1,7) modulation code.

This same article by Schneider teaches a method of detecting read signals that have been recorded with a (1,7) modulation code, and equalized such that the read pulses for ONES are nominally three bits wide at the baseline. The present invention only requires the read signal pulses to be four bits wide at the signal baseline. These wider pulses require far less high frequency boost, and therefore there will be far less high frequency noise at the output of the read equalizer.

Figure 4:
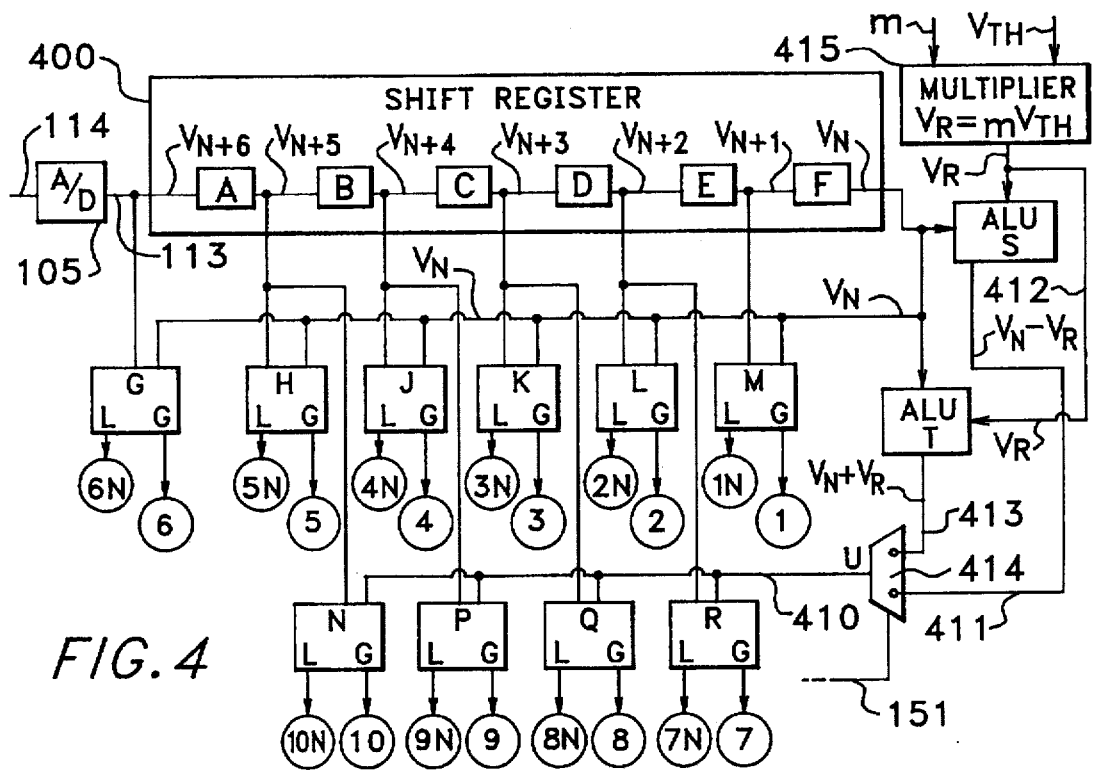
FIGS. 4, 5, and 6 disclose further details of the invention.
Figure 5:
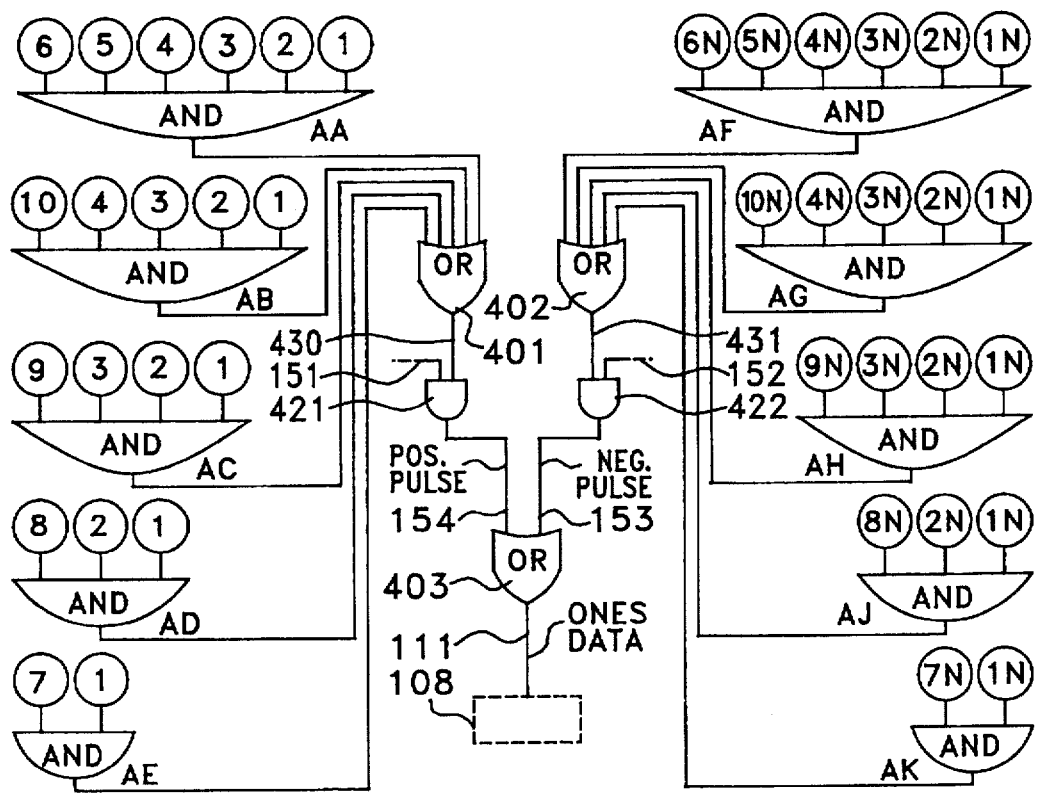
Figure 6:
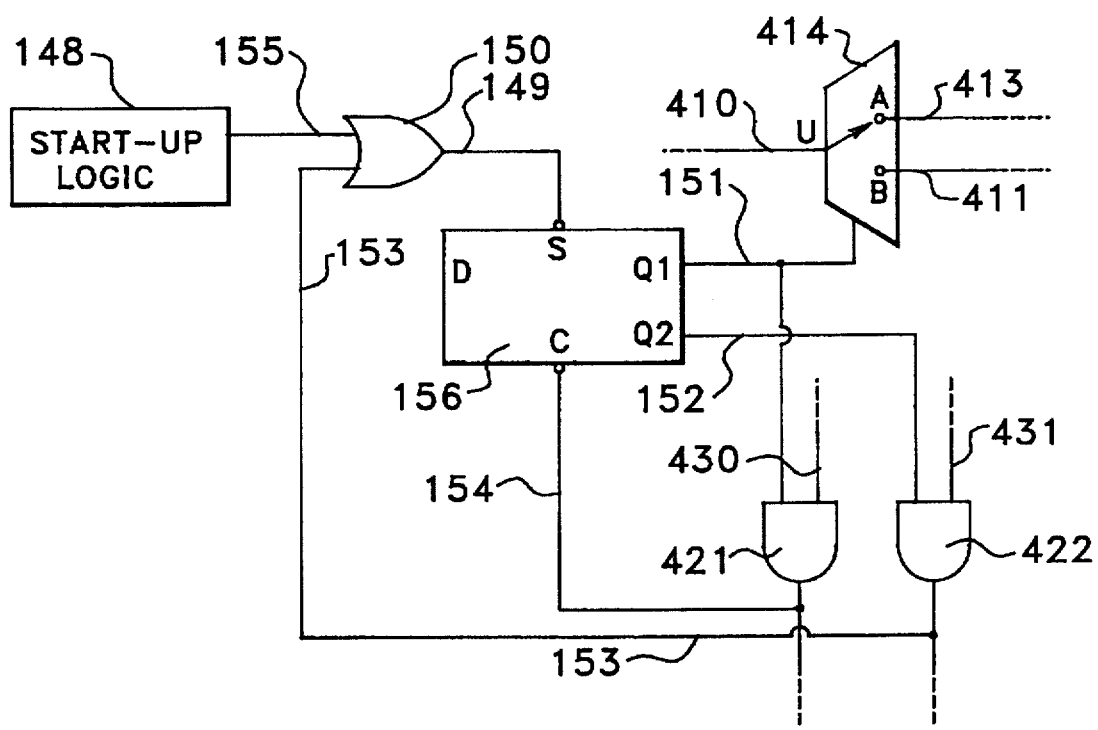

Description of FIGS. 4, 5 and 6

FIGS. 4, 5, and 6 disclose one possible preferred exemplary embodiment of read detector 106 of FIG. 1. FIGS. 4 and 5 disclose a multi-stage shift register 400, comparators G, H, J, K, L, M, N, P, Q, R, AND gates AA through AE and AF, AG, AH, AJ, and AK, OR gates 401, 402, 403, and AND gates 421 and 422 together with arithmetic logic units ALU-S and ALU-T.

Shift register 400 receives output signals from A/D converter 105 representing the amplitude of the signal peaks read by read head 101. The signals received from A/D converter 105 represent the valid data peaks as well as undesirable signal peaks representing noise or intersymbol interference. The received signal peaks may represent a wave form of the type shown in FIG. 3. The signals are sampled at the times shown in FIG. 3 and each signal representing a peak or the lack thereof is stored in successive stages A through F of the shift register 400. Shift register 400 comprises the six stages A through F and at the end of the sampling of six successive signals may contain the signals representing the samples N, N+1, ... through N+6. Stage F of the shift register then contains the sample N and stage A contains the N+6 signal sample.

The detector of FIGS. 4, 5 and 6 further comprises arithmetic logic units ALU-S and ALU-T, each of which receives on its first input the output $V_N$ from stage F of the shift register and on its second input receives a reference voltage $V_R$. Element ALU-S performs a subtraction function and generates an output signal $V_N - V_R$ on path 411 which is applied to the lower position of multiplexor 414. Element ALU-T performs an addition function and generates an output voltage $V_N + V_R$ on path 413 which is applied to the upper position of multiplexor 414. Under control of input 151, multiplexor 414 selects either input 413 ($V_N + V_R$) or input 411 ($V_N - V_R$) to appear at output path 410. Path 410 is connected to the right hand inputs of comparators N, P, Q, and R. The left input of each of these comparators is connected, respectively, to the output of shift register stages A, B, C, and D. By virtue of these connections, the comparators N, P, Q and R and generate positive output signals indicating whether the voltage applied to their right output is greater than the voltage applied to their left input.

The output voltage $V_N$ of shift register stage F is applied to an input of each of elements ALU-S and ALU-T as well as to the right input of each of comparators G, H, J, K, L, and M. The left input of these comparators is applied respectively to the input 113 of the shift register representing signal $V_{N+6}$ as well as to the output of shift register stages $V_{N+5}$ ... $V_N$. Comparators G, H, J, K, L, and M generate output signals representing whether the signal voltage applied to their left hand input is greater or less than the signal voltage $V_N$ applied to the right hand input. The outputs of the comparators and the inputs of the AND gates in FIG. 4 are designated in a manner that indicates the interconnections between the inputs of each AND gate and the comparator outputs to which each AND gate input is connected. Thus, for example, output 1 of comparator M is connected to the input designated 1 of comparators AA, AB, AC, AD, and AE. Similarly, the output 1N of comparator M is connected the correspondingly designated inputs on each of the set of AND gates AF, AG, AH, AJ, and AK. The output designated 1 on comparator M applies a positive potential to its associated AND gates when the signal $V_N$ on its right input is greater than the signal $V_N+1$ on its left hand input. The output 1N of comparator M applies a positive potential to the correspondingly designated inputs of its associated AND gates when the potential $V_N+1$ on its left input is greater than the potential $V_N$ on its right input. The outputs of the other comparators on FIG. 4 function in a similar manner to apply either a positive signal to their right output when the potential on their right input is greater than that on their left input or, alternatively, to apply a positive signal to their left output when the potential on their left input is greater than that on their right input.

As is well known, each AND gate turns on and applies a positive signal representing a binary 1 to its output when all of its inputs are driven high by the outputs of the comparators to which it is connected. A high generated by any of AND gates AA, AB, AC, AD or AE is applied to OR gate 401 and extended through OR gate 401 and enabled AND gate 421 to the input of OR gate 403. Similarly, OR gate 402 receives positive signals representing binary 1's from its associated AND gates AF, AG, AH, AJ, and AK and applies them to via enabled AND gate 422 to an input of OR gate 403. The positive signals received by OR gate 403 are extended as 1's data over path 111 to element 108 shown on FIG. 1.

The binary data processed by the system of FIG. 1 is recorded on the associated magnetic medium in such a manner that successive binary 1's are represented as a string of positive and negative signal peaks. This being the case, the read detector of FIGS. 4 and 5 provides for the detection of digital signals represented by both positive signal peaks and negative signal peaks from A/D converter 105. The set of AND gates AA through AE and OR gate 401 are associated with the reception of a positive signal peak; AND gates AF, AG, AH, AJ, AK and OR gate 402 are associated with the reception of negative signal peaks. The system of which the present invention is a part is capable of anticipating whether the next received valid data pulse is represented by a positive or a negative signal peak. Accordingly, multiplexor 414 is controllably set to its upper and lower position, depending upon the polarity of the next signal peak that is valid to be received. For example, if the next valid signal peak to be received is positive, multiplexor 414 is set to its lower position so that element ALU-S applies the signal $V_N - V_R$ through the multiplexor and via path 410 to the right hand inputs of each of comparators N, P, Q, and R. Conversely, if the next valid signal peak to be received is negative, the multiplexor 414 is set to its upper position so that element ALU-S applies output signal $V_N+V_R$ to the right hand input of each comparator. When multiplexor 414 is in its lower position, the lower right hand output of comparators N, P, Q, and R am selectively energized to receive a positive signal peak. Conversely, when the multiplexor 414 is set to its upper position for the reception of a negative signal peak, signal $V_N+V_R$ from ALU-T is applied to the right hand input of each comparators N, P, Q, and R. In the detection of negative peaks, these comparators generate positive output signals on their left hand outputs such as output 7N for comparator R and 10N for comparator N.

The circuitry of FIG. 4 operates to perform the following Boolean functions indicated in the equations 1 through 10 shown below:

Looking for a Positive Pulse:

$$AE=(V_N>V_{N+1}) \text{ AND } (V_N-V_R>V_{N+2}) \quad (1)$$

OR $$AD=(V_N>V_{n+1}) \text{ AND } (V_N>V_{N+2}) \text{ AND } (V_N-V_R>V_{N+3}) \quad (2)$$

OR $$AC=(V_N>V_{n+1}) \text{ AND } (V_N>V_{N+2}) \text{ AND } (V_N>V_{N+3}) \text{ AND } (V_N-V_R>V_{N+4}) \quad (3)$$

OR $$AB=(V_N>V_{+1}) \text{ AND } (V_N>V_{N+2}) \text{ AND } (V_N>V_{N+3}) \text{ AND } (V_N>V_{N+4}) \text{ AND } (V_N-V_R>V_{N+5}) \quad (4)$$

OR $$AA=(V_N>V_{n+1}) \text{ AND } (V_N>V_{N+2}) \text{ AND } (V_N>V_{N+3}) \text{ AND } (V_N>V_{N+4}) \text{ AND } (V_N>V_{N+5}) \text{ AND } (V_N>V_{N-6}) \quad (5)$$

Looking for a Negative Pulse $$AK=(V_N<V_{n+1}) \text{ AND } (V_N+V_R<V_{N+2}) \quad (6)$$

OR $$AJ=(V_N<V_{n+1}) \text{ AND } (V_N<V_{N+2}) \text{ AND } (V_N+V_R<V_{N+3}) \quad (7)$$

OR $$AH=(V_N<V_{n+1}) \text{ AND } (V_N<V_{N+2}) \text{ AND } (V_N<V_{N+3}) \text{ AND } (V_N+V_R<V_{N+4}) \quad (8)$$

OR $$AG=(V_N<V_{n+1}) \text{ AND } (V_N<V_{N+2}) \text{ AND } (V_N<V_{N+3}) \text{ AND } (V_N<V_{N+4}) \text{ AND } (V_N+V_R<V_{N+5}) \quad (9)$$

OR $$AF=(V_N<V_{n+1}) \text{ AND } (V_N<V_{N+2}) \text{ AND } (V_N<V_{N+3}) \text{ AND } (V_N>V_{N+4}) \text{ AND } (V_N<V_{N+5}) \text{ AND } (V_n<V_{N+6}) \quad (10)$$

Equations 1 through 5 characterize the operation of circuitry of FIG. 4 in the detection of positive pulses. The Boolean equations 6 through 10 characterize the operation of the circuit of FIG. 4 for the detection of negative pulses.

Let it be assumed that the circuitry of FIG. 4 is processing and has received the wave form shown on FIG. 3 with signal N being currently stored in stage F of the shift register and with the signals N+1 through N+5 being stored respectively in stages E, D, C, B, and A of the shift register. The signal at time N is represented by the potential $V_N$ from the stage F of the shift register. The signals N+1 through N+5 are represented by signals $V_{N+1}$ through $V_{N+5}$. The signal $V_{N+6}$ appears on line 113 from the output of A/D 105. Assume that the average peak voltage Vr is 1.0, and assume further that the circuit is in the state to look for a positive pulse. Under these conditions, the 0.1 voltage at time N will not be erroneously recognized as a positive pulse. That is because it is not more than Vr (1.0) greater than $V_{N+2}$, $V_{N+3}$, $V_{N+4}$, $V_{N+5}$ (equations 1 through 4). Outputs 7, 8, 9, and 10, from comparators R, P, Q, and N are therefore negative. Hence, with at least one input to AND gates AE, AD, AC, and AB being negative, the outputs of these gates will also be negative. Nor, is the voltage at time N, $V_N$, the greatest among $V_{N+1}$, $V_{N+2}$, $V_{N+3}$, $V_{N+4}$, $V_{N+5}$, and $V_{N+6}$, (equation 5). In particular, $V_N$ (0.1) is not greater than $V_{N+5}$ (0.5) or $V_{N+6}$ (1.0). Therefore the outputs of comparators H and G will be low, causing the output of AND gate AA to be low. Since the outputs of AND gates, AE, AD, AC, AB, and AA are all low, the outputs of OR circuit 401 is likewise low and hence a positive pulse will not be detected, and a data zero is correctly detected for that bit cell.

The following describes the operation of the circuit of FIG. 4 in detecting the negative pulse shown at time N–2 on FIG. 3. This negative pulse is shown to have a negative amplitude of –1.0. At this time, the signals shown as N–2, N–1 . . . through N+4 are represented by the outputs of shift stages N . . . N+6. The circuit of FIG. 4 is expecting a negative pulse at this time and therefore the switch contacts U are in the upper position so that the element ALU-T applies a signal $V_N+V_R$ from its output via the upper switch contacts to the right input on each of comparators N, P, Q and R. At this time, the conditions characterized by all of the Boolean equations 6 through 10 are satisfied. For example with respect to equation 6 the term $V_N$ is now –1.0; the term $V_{N+1}$ is –0.5; the term $V_{N+2}$ is +0.1; and, the term $V_R$ is +1.0. The first part of equation 6 is satisfied: $V_N<V_{N+1}$, or –1.0<–0.5. The IN (left) output of comparator M will be high. The second part of equation 6: $V_N+VR<VN+2$; or –1.0+1.0<0.1 is also satisfied. Thus the 7N output of comparator R is also high. Hence, the output of AND gate AK is also high. This will bring the output of OR gate 501 high, indicating that a negative pulse has been detected. This causes positive signals to be extended through OR gate 402 and 403 and over path 111 to element 108 indicating that a valid negative pulse is detected at time N–2 shown on FIG. 3.

If a sample were taken at time N+5 with the value of 0.5 being in the stage F of the shift register, a positive signal would not be detected since the term $V_N>V_{N+1}$ could not be met since the voltage 0.5 is not>the voltage 1.0. This term is in all of equations 1 through 5 and therefore none of equations 1 through 5 would be met and a positive signal would not be applied by any of the AND gates AA through AE through the OR gates to an over path 111 to element 108. Similarly, a valid negative pulse indication would not be obtained for a sample of –0.5 at time N–1 on FIG. 3 having detected a negative pulse at time N–2, set/reset flip-flop Z is set to look for a positive one.

The proper operation of the circuit of FIGS. 4, 5, and 6 depends upon a knowledge of whether next signal peak received will be positive or negative. This function is performed by the circuitry shown on FIG. 6 which includes start-up logic element 148, flip-flop 156 and AND gates 421 and 422 which are also shown on FIG. 5.

At system start up time the start up logic element 148 applies a positive pulse to path 155. This positive pulse is extended through OR gate 150 and applied over path 149 to the S input of flip-flop 156. A positive pulse on the S input switches the flip-flop to a state in which it's Q1 output is high and it's Q2 output is low. The high on the Q1 output is applied over path 151 to the left input of AND gate 421 which is also shown on FIG. 5. The high on this input of the AND gate permits the AND gate to respond to a high on it's other input which is path 430 on FIG. 5. A high is applied to path 430 whenever the output one of the AND gates AA, AB, AC, AD, AE goes high representing the detection of a positive signal peak. Thus, the high on the left input 151 of AND gate 421 permits it to turn on in response to the application of a high to its input path 430. In turning on, the AND gate applies a high to its output path 154 which on FIG. 5 extends through OR gate 403 to cause a high signal to be applied to path 111. The high on path 154 from the output of AND gate 421 is extended to the clear (c) input of flip-flop 156 to switch it to its other state in which its Q2 output is high while its Q1 output is low. The low on the Q1 output is applied to the left input of AND gate 421 to switch it to an inhabited state in which it cannot turn on. The high on the Q2 output is applied via path 152 to the left input of AND gate 422 which on FIG. 5 comprises part of the circuitry including OR gate 402 and OR gate 403 which comprise the path over which a pulse is applied to path 111 indicating the reception of a valid negative signal peak. When such a signal is received, it is applied to input 431 of AND gate 422 to turn it on and permit the high on this output to be extended over path 153 and OR gate 403 to output path 111. The high on path 153 is extended through OR gate 150 and over path 149 to the S input of flip-flop 156 to once again switch it to a state in which controls the circuitry of FIGS. 4 and 5 so that it can detect the reception of a positive signal peak.

The Q1 output of flip-flop 156 is connected over path 151 to the control input of multiplexor 414 to control whether path 410 on the left side of the multiplexor if to be switchable connected to path 413 or path 411 on the right side of the multiplexor. As shown on FIG. 4, the switchable position of the multiplexor 414 determines whether the output of element ALU-S which comprises the potential $V_N - V_R$ or whether the output of element ALU-T which comprises the potential $V_N + V_R$ will be connected to path 410 and, in turn, to the right input of each of comparators N, P, Q, and R.

As already mentioned, the Q1 output is high whenever the system is awaiting the receipt of a positive signal peak. At this time, it is necessary that the signal $V_N - V_R$ from element ALU-S be connected over path 410 to comparators N, P, Q, and R. This being the case, the high on path 151 from the Q1 output of the flip-flop is extended to the control input of multiplexor 414 so that path 410 is connected to path 411 which applies to path 410 the potential $V_N - V_R$ that is required by the comparators N, P, Q, and R at this time.

When the flip-flop 156 switches to its reset state so that the system awaits the reception of a negative signal peak, the Q1 output goes low and causes the multiplexor to switch to its state in which path 410 is connected to path 413. This causes the output potential $V_N + V_R$ of element ALU-T to be applied to the right hand input of comparators N, P, Q, and R via path 410.

As another aspect of this invention, the value of reference voltage $V_R$ can be varied to a lesser value in a region of media defects where the signal drop out errors were common. The value of the voltage $V_R$ can also be increased to a larger value in a region of high noise on the media. The control of the value of the magnitude of voltage of $V_R$ is done by multiplier 415 which has an input of $V_{TH}$ representing a threshold value and a multiplier factor of m. The output voltage of $V_R$ is equal to the multiplier factor m times the threshold voltage $V_H$. The value m is varied by the system facilities that control the reading of the tape and where required, the re-reading of the tape when excessive noise is encountered.

The system of the present invention is also effective when a valid data peak has been recorded in a first bit cell for enabling the detection of the valid data peak in the presence of noise in adjacent bit cells that is less than F where F is equal to the average value of the valid data peak minus the average amplitude of an isolated pulse in an adjacent bit cell. This capability is permitted by the term $V_N > V_{N+1}$ in equations 1 through 5 and as well as in the comparable term $V_N < V_{N+1}$ in equations 6 through 10. The logic means of the present invention is effective for enabling the detection of a valid data peak in a first bit cell in the presence of noise in bit cells not adjacent to the first bit cell where the noise amplitude is less than the average peak value of the valid data peak. This capability is permitted by the term $V_N - V_R > V_{N+2}$ in equation 1 and in comparable terms in equations 2 through 5. This capability is also facilitated by the term $V_{N+R} < V_{N+2}$ in equation 6 as well as comparable terms and equations 7 through 10.

The element ALU-T and ALU-S may each be a National Semiconductor type 74F181 device.

I claim:

1. In a detector for detecting received signals representing valid positive and negative peaks of data signals encoded in a (1,7) format, said detector comprising:

means including a multi-stage shift register having at least six stages for receiving and storing successively received signals;

comparator means having inputs connected to each stage of said shift register as well as to an input of said shift register;

said comparator means being responsive to the receipt of said signals by said shift register for generating output signals indicating the relative magnitude of signals stored in each different stage of said shift register;

logic means having inputs connected to outputs of said comparator means for receiving signals from said comparator means;

said logic means being responsive to the receipt of said signals from said comparator means for generating an output signal indicating the presence of a valid data peak or absence of a valid data peak in response to each signal received by said detector, said comparator means and said logic means being effective in response to a receipt of said signals by said detector when a valid data peak recorded in a first bit cell is received for enabling the detection of said valid data peak in the presence of noise in an adjacent bit cell having an amplitude less than F where F is equal to the average peak value of the amplitude of said valid data peak minus the average amplitude of an isolated pulse in an adjacent bit cell;

said comparator means and said logic means being effective in response to the receipt of said signals by said detector for bit cells not adjacent to a cell where a valid data peak has been recorded for enabling the detection of a valid data peak in the presence of noise whose amplitude is less than the average peak value of the amplitude of said valid data peak.

2. The detector of claim 1 wherein said detector further comprises;

means for receiving a first reference signal having an amplitude of $V_R$;

ALU means for creating a second reference signal by controllably adding or subtracting said first reference signal from a signal $V_N$ received from said last stage of said shift register; and means for applying said second reference signal from said ALU means to inputs of said comparator means.

3. The detector of claim 2 wherein said ALU means comprises a first ALU for generating a second reference signal having an amplitude of $V_N+V_R$, and further comprises a second ALU for generating a second reference signal having an amplitude of $V_N-V_R$; and wherein said detector further comprises means for connecting either an output of said first ALU or said second ALU to inputs of said comparators.

4. The detector of claim 1 wherein said logic means comprises a first logic means for generating an output signal representing the receipt of a positive valid data peak by said detector and further comprises a second logic means for generating an output signal representing the receipt of a negative valid data peak by said detector.

5. In a detector for detecting the receipt of signals representing alternating positive and negative valid peaks of data signals encoded in a (1,7) format wherein said data signals represent the presence of a valid data peak or absence of a valid data peak for each received signal; said detector comprising:

means including a multi-stage shift register having at least six stages for receiving and storing at least six successively received signals;

comparator means having inputs connected to each of said stages of said shift register as well as to an input of said shift register;

said comparator means being responsive to the receipt of said at least six signals by said shift register for generating output signals indicating the relative magnitude of signals stored in different ones of said shift register stages;

logic means having inputs connected to outputs of said comparator means;

wherein said logic means comprises a first logic means for generating an output signal representing the receipt of a valid data peak represented by a positive binary 1 by said detector and further comprises a second logic means for generating an output signal representing the receipt of a valid data peak represented by a negative binary 1 by said detector;

said logic means being responsive to the receipt of signals from said comparator means for generating an output signal indicating the receipt of a valid data peak or the absence of a valid data peak by said detector in response to each signal received by said detector;

said comparator means and said logic means being effective in response to a receipt of signals by said detector when a valid data peak recorded in a first bit cell is received for enabling the detection of said valid data peak in the presence of a signal representing noise in an adjacent bit cell having an amplitude less than F where F is equal to the average peak value the amplitude of said valid data peak minus the average amplitude of an isolated pulse in an adjacent bit cell;

said comparator means and said logic means being effective in response to a receipt of signals by said detector for bit cells not adjacent the cell where a valid data peak has been recorded for enabling the detection of a signal representing a valid data peak in the presence of a signal representing noise that is less in amplitude than the average peak value of said the amplitude of valid data peak.

6. The detector of claim 5 wherein said detector further comprises;

means for receiving a first reference signal having an amplitude of $V_R$;

ALU means for generating a second reference signal by controllably adding or subtracting said first reference signal from a signal $V_N$ from a last stage of said shift register;

means for applying said second reference signal from said ALU means to inputs of said comparators.

7. The detector of claim 6 wherein said ALU means comprises a first ALU for generating a first reference signal of $V_N+V_R$ and further comprises a second ALU for generating a second reference signal of $V_N-V_R$; and wherein said detector further comprises means for controllably connecting either the output of said first ALU or said second ALU to said inputs of said comparators.

8. A method of operating a detector for detecting the receipt by said detector of valid positive and negative peaks of data signals encoded in a (1,7) format, said method comprising the steps of:

entering successive received signal samples into a multi-stage shift register having at least six stages;

applying signals from each stage of said shift register to inputs of comparator and logic means;

said comparator and logic means being responsive to the receipt of said signals from said shift register for generating an output signal indicating the presence of a valid data peak or absence of a valid data peak upon the receipt of each signal by said detector;

said comparator and logic means being effective in response to the receipt of a signal by said detector when a valid data peak has been recorded in a first bit cell for enabling the detection of a valid data peak in adjacent bit cells in the presence of noise in an adjacent bit cell having an amplitude less than F where F is equal to the average peak value of the amplitude of said valid data peak minus the average amplitude of an isolated pulse in an adjacent bit cell;

said logic means being effective in response to the receipt of a signal by said detector for bit cells not adjacent to the cell where a valid data peak has been recorded for enabling the detection of a valid data peak in the presence of noise whose amplitude is less than the average peak value of the amplitude of said valid data peak.

* * * * *